United States Patent [19]

McClure

[11] Patent Number: 5,118,024
[45] Date of Patent: Jun. 2, 1992

[54] REMOTE PIPE FITTING TOOL

[76] Inventor: Gary W. McClure, Rte. 7, Box 228A, South Charleston, W. Va. 25309

[21] Appl. No.: 739,094

[22] Filed: Aug. 1, 1991

[51] Int. Cl.$^5$ ............... B23K 37/04; B23K 101/10
[52] U.S. Cl. .................. 228/44.5; 228/49.3; 29/272; 269/43
[58] Field of Search ............ 228/44.5, 49.3; 269/43; 29/272

[56] References Cited

U.S. PATENT DOCUMENTS

| | | | |
|---|---|---|---|
| 3,400,872 | 9/1968 | Rogers | 228/44.5 |
| 3,925,854 | 12/1975 | McFadden | 228/49.3 X |
| 3,952,936 | 4/1976 | Dearman | 228/49.3 |
| 4,750,662 | 6/1988 | Kagimoto | 228/49.3 X |
| 4,769,889 | 9/1988 | Landman et al. | 269/43 X |

Primary Examiner—Kenneth J. Ramsey
Attorney, Agent, or Firm—Fleit, Jacobson, Cohn, Price, Holman & Stern

[57] ABSTRACT

A remote pipe fitting tool for adjustably positioning the ends of relatively small pipes while being tack welded. The tool includes clamps engaging adjacent pipe ends with each of the clamps including laterally extending arms which are interconnected at their outer ends by a plurality of spaced turnbuckles with a pair of outermost turnbuckles and an inner turnbuckle adjusting various relationships between the pipe ends. Each of the arms includes means to longitudinally adjust the length thereof to move the adjacent pipe ends transversely in relation to each other. Also, each arm includes a jack bolt and pivot structure enabling the clamps and thus the pipe ends to be angularly adjusted. The remote pipe tool enables adjacent pipe ends to be joined to be universally adjusted in relation to each other in an accurate, positive, quick and easy manner thereby greatly facilitating the positioning of pipe ends when being joined by welding.

7 Claims, 1 Drawing Sheet

REMOTE PIPE FITTING TOOL

BACKGROUND OF THE INVENTION

1. Field of the Invention

The present invention generally relates to a remote pipe fitting tool and more specifically a tool of this type for adjustably positioning the ends of relatively small pipes while being tack welded. The tool includes clamps engaging adjacent pipe ends with each of the clamps including laterally extending arms which are interconnected at their outer ends by a plurality of spaced turnbuckles with a pair of outermost turnbuckles and an inner turnbuckle adjusting various relationships between the pipe ends. Each of the arms includes means to longitudinally adjust the length thereof to move the adjacent pipe ends transversely in relation to each other. Also, each arm includes a jack bolt and pivot structure enabling the clamps and thus the pipe ends to be angularly adjusted. The remote pipe tool enables adjacent pipe ends to be joined to be universally adjusted in relation to each other in an accurate, positive, quick and easy manner thereby greatly facilitating the positioning of pipe ends when being joined by welding.

2. Description of the Prior Art

My prior U.S. Pat. No. 4,846,391 issued Jul. 11, 1989 discloses a tool for assisting in connecting tubes or pipes and copending application Ser. No. 07/442,151 filed Nov. 28, 1989, now U.S. Pat. No. 5,052,608, discloses a pipe fitting tool for adjusting the adjacent ends of pipes or fittings to be joined. The prior art cited in the above application and patent also relate to this invention and are made of record by reference thereto. None of the prior art in this field of endeavor discloses an arrangement in which the adjacent ends of pipes to be welded or joined can be quickly, easily and positively adjusted and positioned in relation to each other from points remote from the pipes being joined which enables the tool to be utilized with relatively small pipes oriented in restricted areas.

SUMMARY OF THE INVENTION

An object of the present invention is to provide a remote pipe fitting tool for positioning adjacent pipe ends accurately in relation to each other to enable the pipe ends to be tack welded with the weld being completed after the pipe fitting tool has been removed.

Another object of the invention is to provide a remote pipe fitting tool which includes a pair of clamps rigidly attached to the adjacent ends of pipes to be joined with a laterally extending arm mounted on each clamp and being provided with structural arrangements which enable accurate and positive adjustment of the pipe ends universally in relation to each other to align the pipe ends, orient them in desired spatial relation and orient the pipe ends in required angular relation.

A further object of the invention is to provide a remote pipe fitting tool in accordance with the preceding object in which each arm includes a longitudinal adjustment to move the pipe ends transversely in relation to each other, a pivotal connection with jack bolt to move the pipe ends in angular relation, turnbuckle assemblies to move the pipe ends toward and away from each other, in swinging and angular relation to each other and to twist the pipe ends about an axis perpendicular to the angular adjustment structure for the pipe ends.

Still another object of the present invention is to provide a remote pipe fitting tool in accordance with the preceding objects which is especially adapted for use with small pipe oriented in confined spaces since the adjustment structure for positioning the pipe ends is remotely located in relation to the pipes being joined with the tool being relatively easy to manipulate and of rugged, long lasting construction.

These together with other objects and advantages which will become subsequently apparent reside in the details of construction and operation as more fully hereinafter described and claimed, reference being had to the accompanying drawings forming a part hereof, wherein like numerals refer to like parts throughout.

DESCRIPTION OF THE PREFERRED EMBODIMENT

Figure 1:
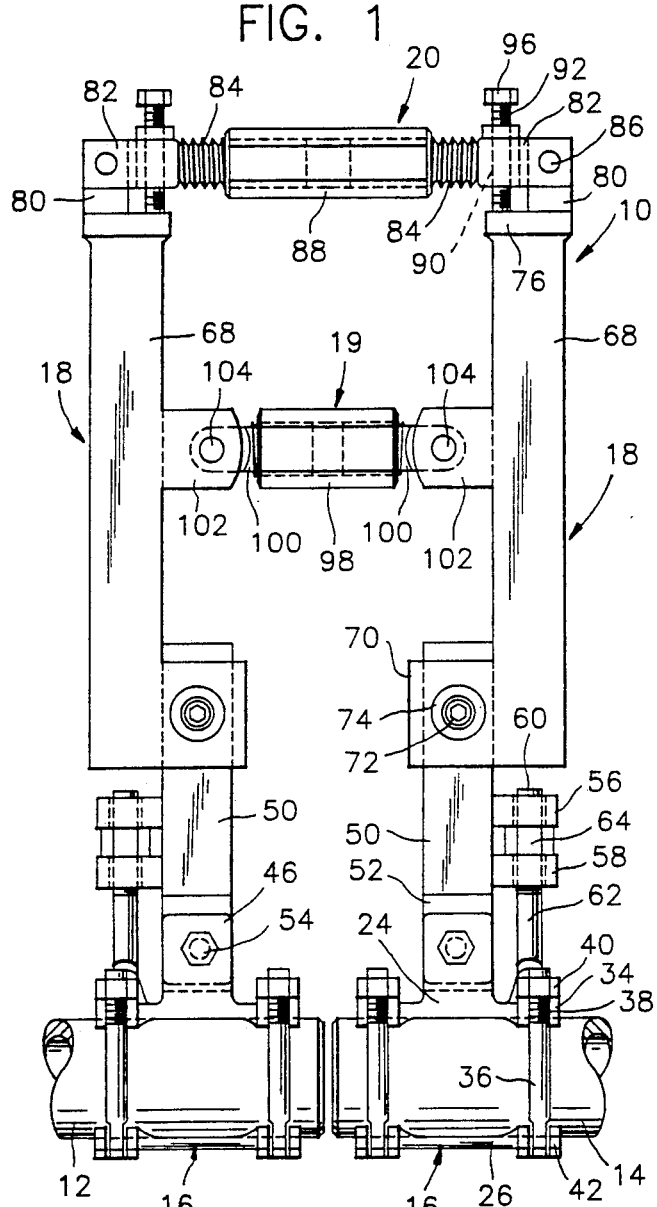
FIG. 1 is a side elevational view of the remote pipe fitting tool of the present invention.

Referring now specifically to the drawings, the pipe fitting tool of the present invention is generally designated by reference numeral 10 and is illustrated to connect to pipe sections or fittings 12 and 14. The tool includes a pair of clamps 16 of identical construction which are rigidly affixed to the pipe sections 12 and 14 with each of the clamps including a laterally extending arm assembly 18 which are interconnected by an inner turnbuckle 19 and a pair of outer turnbuckles 20 and 22.

Each clamp 16 includes a top clamp member 24 and a bottom clamp member 26 with each of the clamp members being partially cylindrical in configuration and provided with a partial cylindrical internal surface 28 to engage the external periphery of the pipe sections 12 or 14. One end edge of the clamp members 24 and 26 is provided with outwardly projecting hinge barrels 30 pivotally interconnected by a hinge pin 32. The other edge of the top clamp member 24 includes a laterally extending bifurcated lug 34 receiving a clamp bolt 36 having a screw threaded end 38 receiving a nut 40 thereon. The other edge of the lower clamp member 26 is provided with a bifurcated lug 42 receiving a flattened end of the bolt 36 therein with the bifurcated lug 42 and the flattened end of the bolt 36 being secured together by a pivot pin 44. The lug 34 being bifurcated enables the bolt 36 to pivot into engagement with and disengagement from the lug 34 when the nut 40 has been loosened. The clamp can thus be easily and quickly and rigidly affixed to the pipe sections 12 and 14 with the pair of clamp bolts on each clamp rigidly and securely securing the clamp 16 to the pipe sections 12 and 14.

Figure 2:
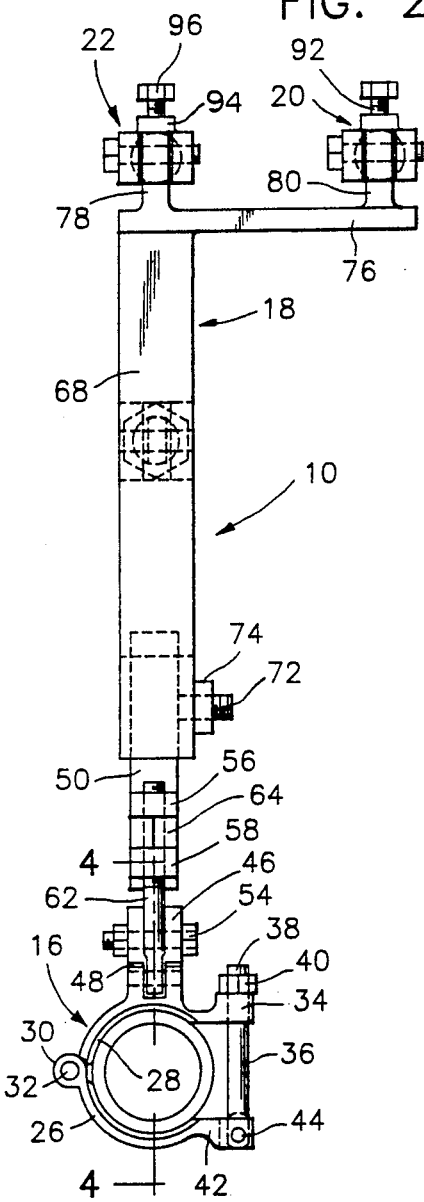
FIG. 2 is an end elevational view thereof.
Figure 3:
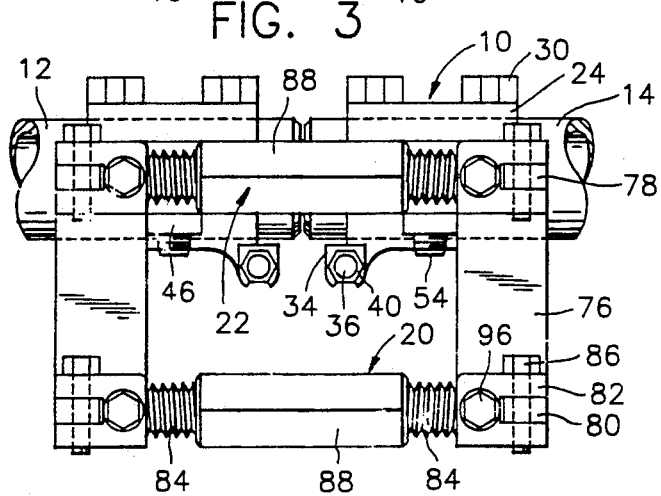
FIG. 3 is a top plan view of the tool.
Figure 4:
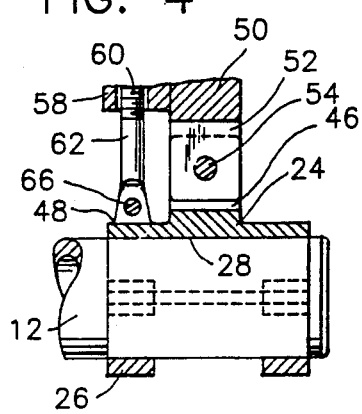
FIG. 4 is a sectional view taken along section line 4—4 on FIG. 2 illustrating further structural details of the tool.

Each of the top clamp members 24 includes a pair of lugs 46 projecting laterally therefrom with the lugs being in spaced parallel relation and the space between the lugs being in alignment with the center of curvature of the internal surface 28 and in alignment with the center of the pipe sections 12 and 14. Outwardly of each pair of lugs 46, each top clamp member 24 includes a second pair of lugs 48 which are in alignment with the lugs 46 but of substantially shorter height as illustrated in FIG. 2. The lugs 48 are oriented at the outer ends of the clamps 16 as illustrated in FIG. 1.

The lugs 46 receive the inner end of an inner arm 50 forming part of the arm assembly 18. The inner end of the inner arm 50 is flattened into a lug 52 having parallel surfaces which closely fit between the lugs 46. A pivot bolt 54 extends through the lugs 46 and the flattened end 52 on the arm 50 to pivotally connect the inner arm 50 to the clamp 16. The outer edge of the inner arm 50 is provided with a pair of spaced lugs 56 and 58 which are in alignment with each other and are apertured to receive the threaded end 60 of a jack bolt 62. A nut 64 is threaded onto the threaded end of the jack bolt 60 and is received between the lugs 56 and 58. The other end of the jack bolt is flattened and is received between the pair of lugs 48 and is secured thereto by a pivot pin 66. Thus, by rotating the nut 64, the lugs 56 and 58 can be moved toward and away from the clamp 16 thus pivoting the clamp 16 in relation to the inner arm 50 about the pivot bolt 54 thus enabling angular adjustment of the pipe sections about the axis defined by the pivot bolts 54.

Each arm assembly 18 also includes an outer arm 68 in the form of an elongated rigid member having an inwardly offset sleeve 70 at the inner end thereof which slidably receives the outer end of the inner arm 50 therethrough. A clamp screw 72 in the form of a set screw is screw threaded through an internally threaded boss 74 rigid with the outer surface of the sleeve 70 into clamping engagement with the inner arm 50. By loosening or tightening the set screw 72, the inner arm 50 can be moved longitudinally inwardly and outwardly in relation to the outer arm 68 thereby moving the pipe sections 12 and 14 transversely in relation to the longitudinal axis of the pipe section.

The outer end of each outer arm 68 is provided with a laterally extending narrow plate 76 rigid with and perpendicular to the outer end of each outer arm. Each of the plates 76 is provided with an upstanding lug 78 aligned with the center of the outer arm 68 and an upstanding lug 80 adjacent the end of the plate 76 remote from the outer arm 68. The turnbuckles 20 and 22 interconnect the lug 78 and 80 on the respective outer arms 68 with the turnbuckle 22 interconnecting the lug 78 and the turnbuckle 20 interconnecting the lugs 80. Each turnbuckle 20 and 22 includes a pair of bifurcated end yokes 82 having an externally threaded end portion 84 with a pivot pin 86 connecting the bifurcated ends 82 to the respectively lugs 78 and 80. The bifurcated ends 82 are interconnected by an internally threaded central member 88 which is in opposite screw threaded engagement with the oppositely threaded end portions 84 of the bifurcated ends 82 in a conventional turnbuckle structure so that when the central member 88 is rotated, the bifurcated ends 82 will be either moved towards each other or moved away from each other as is well known thus enabling the outer ends of the outer arms to be moved towards and away from each other by operating the turnbuckles 20 and 22 in exactly the same direction at the same time and also enabling the outer arm 68 and thus the arm assemblies 18 to be twisted about an axis perpendicular to the axis of the pipe sections by adjusting one of the turnbuckles 20 and 22 in a manner different from the other of the turnbuckles 20 and 22 as well as swinging the arms in relation to each about an axis transverse to the ends of the arms 68.

Also, each of the bifurcated ends 82 includes an internally threaded bore 90 receiving an adjustment screw 92 therethrough which has a lower end abuttingly engaging the top surface of the side plate 76 inwardly of the lug 78 or 80. The screw threaded member 92 includes a lock nut 94 and a bolt head 96 by which the screw threaded member 92 can be screwed inwardly or outwardly to move the arm assemblies 18 toward and away from each other about pivot points 86 with the degree of movement being determined by the screw threaded members 90.

The outer arms 68 are also interconnected by an inner turnbuckle 19 which includes a central oppositely and internally threaded member 98 receiving externally screw threaded end members 100 which are received between a pair of lugs 102 rigid with the outer arms 68 with a pivot pin 104 connecting the ends 100 of the turnbuckle 19 with the lugs 102. The pivot pins 104 form axis of movement of the arm assemblies 18 when the turnbuckles 20 and 22 are manipulated and determine the movement capable of being obtained from adjusting the screw threaded members 92.

With the structure described and illustrated, the pipe sections can be accurately, quickly, easily and positively oriented in desired relation to each other for tack welding. The outer and inner turnbuckles enable the arm assemblies to be spread apart or closed together and twisted about the longitudinal axis which is at 90° from the longitudinal axis of the pipe sections. The pivot axis defined by the bolts 54 is in alignment with the center of the clamps 26 so that the jack bolts can pivot the clamp members and thus the ends of the pipes about an axis perpendicular to the pipe and the longitudinal axis of the arm assemblies. The center of the jack bolts is spaced a finite distance, such as 1", from the pivot axis defined by the bolt 54 with the jack bolts being able to move the clamp member in either direction about the pivot bolt 54. The clamp bolts 36 are straight and are hinged to the bifurcated lug 42 and can move into and out of the bifurcated lug 34. The inner and outer arms can adjust only longitudinally in relation to each other to transversely move the pipe sections in relation to each other and the inner turnbuckle and outer turnbuckles can be manipulated to move the pipe sections in a linear manner towards and away from each other and also can swing the pipe sections toward and away from each other, twist the pipe sections in relation to each other about the longitudinal axis of the arm assemblies and swing the arm assemblies about an axis perpendicular to the outer ends of the outer arms 68 and generally along the axis of turnbuckle 22. The various pivotal connections have sufficient clearances to enable the universal adjustment of the pipe sections 12 and 14 in relation to each other in order to accurately and positively position the pipe sections in aligned, spaced relation or any other desired relation while the ends of the pipe sections are tack welded between the clamps 16. After the pipe sections have been tack welded, the tool can be removed and the welding operation completed in a conventional manner. This structure enables relatively small pipes oriented in restricted spaces to be accurately positioned since the clamps can be easily positioned around the pipe sections and clamped thereon by the bolts and nuts which face outwardly in the direction of the laterally extending arm assemblies. The remote operation of the tool to only one side of the pipe sections being connected greatly facilitates the capability of small pipe sections to be oriented while in restricted areas.

The foregoing is considered as illustrative only of the principles of the invention. Further, since numerous modifications and changes will readily occur to those skilled in the art, it is not desired to limit the invention to the exact construction and operation shown and described, and, accordingly, all suitable modifications and equivalents may be resorted to, falling within the scope of the invention.

What is claimed as new is as follows:

1. A remote pipe fitting tool for accurately positioning adjacent ends of pipe sections for welding from points remote from and to only one side of the pipe sections, said tool comprising means secured fixedly to each of a pair of adjacent pipe ends, a laterally extending arm assembly connected to each of said means, said arm assemblies extending laterally of the pipe ends, means interconnecting the arm assemblies at points spaced laterally from the pipe ends and spaced laterally in relation to each other for moving the pipe sections universally in relation to each other, each arm assembly including longitudinally adjustable means to move the pipe sections transversely in relation to each other and means pivotally interconnecting the arm assemblies and the means on each pipe end to adjust the pipe ends about an axis perpendicular to the longitudinal axis of the pipe ends and perpendicular to the longitudinal axis of the arm assemblies.

2. The tool as defined in claim 1 wherein each arm assembly includes an inner arm and an outer arm, said means enabling longitudinal adjustment including an offset sleeve at the inner end of the outer arm slidably receiving the outer end of the inner arm and said screw means locking the inner and outer arms in longitudinally adjusted position.

3. The tool as defined in claim 2 wherein the inner end of said inner arm is received between a pair of lugs rigid with the means fixed to the pipe section, a pivot bolt interconnecting the lugs and the inner end of the inner arm to pivotally connect the arm assembly thereto for pivotal movement of the pipe end about an axis perpendicular to and spaced laterally from the pipe end.

4. The tool as defined in claim 3 together with a jack bolt interconnecting the inner arm and the means fixed to the pipe end in spaced relation to the pivot axis between the inner arm and means fixed to the pipe section to pivot the pipe section in either direction about the pivotal connection between the means fixed to the pipe section and the inner end of the inner arm.

5. The tool as defined in claim 4 wherein said means fixedly secured to each of the pipe ends includes a split clamp having one edge pivotally connected and a clamp bolt interconnecting the opposite edges to secure the clamp to the pipe end with said lugs and jack bolt being connected with one of the clamp members.

6. The tool as defined in claim 5 wherein said means interconnecting the arm assemblies includes an inner turnbuckle interconnecting the outer arms intermediate the ends thereof and a pair of turnbuckles interconnecting the outer ends of the outer arms, the outer end of each outer arm including a laterally extending end plate generally perpendicular to the longitudinal axis of the pipe ends with one turnbuckle being aligned with the outer arm and the other turnbuckle spaced laterally thereof with both turnbuckles being generally parallel to the longitudinal axis of the pipe ends with manipulation of the outer turnbuckles and inner turnbuckle moving the pipe sections toward and away from each other and manipulation of the outer turnbuckles in opposite directions twisting the arm assemblies about an longitudinal axis perpendicular to the longitudinal axis of the pipe sections and the pivotal axis of the inner arm to twist the pipe sections in relation to each other.

7. The tool as defined in claim 6 wherein each end of each outer turnbuckle is pivotally connected to said lateral plate and screw threaded means extending through the end portion at each end of each of the outer turnbuckles and abuttingly engaging the end plate in spaced relation to the pivotal connection between the turnbuckle and end plates to vary the angular position of the turnbuckles and end plates thereby swinging the arm assemblies outwardly and inwardly in relation to each other with the limits of movement being determined by the inner turnbuckle and swinging the arm assemblies about an axis generally paralleling the axis of the pipe ends.

* * * * *